3,165,393
METHOD OF INHIBITING PLANT GROWTH

Geert C. Vegter, Amsterdam, Netherlands, and Johannes T. Hackmann, Caversham, Dence Park, Herne Bay, Pieter Ten Haken, Herne Bay, and Geoffrey E. Barnsley, Harbledown, near Canterbury, England, assignors to Shell Oil Company, a corporation of Delaware
No Drawing. Filed Nov. 24, 1958, Ser. No. 775,716
Claims priority, application Great Britain, Dec. 30, 1957, 40,286/57
3 Claims. (Cl. 71—2.7)

This invention relates to a novel herbicidal composition of matter and to its use. More particularly, the present invention concerns novel herbicidal compositions containing as an active ingredient bis(2,2,2-trichloro-1-hydroxyethyl)sulfide which manifest selective toxicity toward monocotyledonous plants.

The novel compositions of the invention comprise bis(2,2,2-trichloro-1-hydroxyethyl)sulfide as an active ingredient and a carrier or a surface-active agent or a carrier and a surface-active agent.

The bis(2,2,2-trichloro-1-hydroxyethyl)sulfide is readily prepared by reacting hydrogen sulfide with chloral, preferably in concentrated aqueous solution. The crystalline product obtained can be used as such or after purification, for example, by recrystallization.

In the presence of water, dissociation of the bis(2,2,2-trichloro-1-hydroxyethyl)sulfide into chloral and hydrogen sulfide tends to occur and it is therefore advantageous to incorporate a minor proportion, i.e., up to 50% by weight of the sulfide, of chloral or chloral hydrate as a stabilizer. Such stabilized compositions are a further feature of the invention. It is preferable that compositions intended for transport or storage are anhydrous or substantially anhydrous.

The active ingredient of the present compositions may be employed as concentrates which are diluted with additional carrier to produce the ultimate treating composition. In concentrates the active ingredient may be present in a concentration of from 10 to 95% by weight.

In pre-emergence applications, the compositions of the invention are suitably used at a rate of 5 to 50 pounds per acre of the active ingredient. Somewhat higher rates, for example, 25 to 50 pounds per acre, are required for post-emergence applications. To supply the desired dosage, the concentration of active ingredient in the compositions applied is in general from about 0.01 to 50% by weight for liquid compositions and from about 5 to 20% by weight for dusts.

Dust concentrates are prepared by mixing the bis(2,2,2-trichloro-1-hydroxyethyl)sulfide, with or without chloral or chloral hydrate, with a solid carrier and then comminuting the mixture, for example, in a hammer mill or an air jet mill, or by intimately mixing the finely divided components. Examples of carriers which may be used for this purpose are the china clays, attaclay, fuller's earth, pyrophyllite, attapulgite, talc or bentonite. The dust concentrates may be diluted for application with the same carrier or with a different carrier. These solid carriers may be oil treated to improve their adhesion to the surface to which they are applied. If desired, these dust compositions may be compressed into pellets or granules.

Sand may also be used as a carrier, mixtures of the sulfide and sand being particularly suitable for incorporation into soil.

The compositions of the invention may be in the form of wettable powders. These may comprise a major proportion of the bis(2,2,2-trichloro-1-hydroxyethyl)sulfide, for example, at least 80% by weight, and a minor proportion of a dispersing agent. Alternatively, the wettable powders may contain at least 10% by weight of the sulfide mixed with a finely divided solid carrier as indicated above, and a dispersing agent. Dispersing agents which may be employed include the sodium or calcium salts of the lignin sulfonic acids derived from sulfite cellulose waste liquors, for example, Goulac (registered trademark) and the sodium or calcium salts of condensed arylsulfonic acids such as are available under the trades names Leukanol, Intraphore and Tamol. It is advantageous in some cases to incorporate a small proportion, for example 0.5 to 1% by weight of the total composition, of a wetting agent. Suitable wetting agents for this purpose are the water-soluble salts of alkyl sulfuric acids and alkyl arylsulfonic acids containing at least 10 carbon atoms in the molecule, for example, the sodium salts of secondary alkyl sulfuric acid esters containing from 10 to 18 carbon atoms in the molecule available under the registered trademark "Teepol" and sodium dodecylbenzene sulfonate. Chloral or chloral hydrate may be incorporated. Other additives may be present, for example, water conditioning agents such as sodium phosphate or a sodium polyphosphate, or cellulose ethers such as methyl cellulose or the sodium salt of cellulose glycollic acid. These compositions are diluted with water for application.

Advantageously, a fertilizer or mixture of fertilizer may be used as the carrier, thus enabling weed control and fertilizing treatments to be combined in a single operation. The fertilizer or fertilizers used may be organic or inorganic fertilizers or a mixture of organic and inorganic fertilizers. These may be in pulverulent, granular or pelleted form or in liquid form, for example, in aqueous solution. Examples of fertilizers which may be used are basic slag, superphosphate, triple superphosphate, ammonium nitrate and sulfate, gypsum, dolomite, nitrochalk, kainite, triammonium phosphate, diammonium phosphate, urea, calcium cyanamide and mixtures of two or more of these substances. The bis(2,2,2-trichloro-1-hydroxyethyl)sulfide may be incorporated in the fertilizer or mixture of fertilizers in solid or liquid form. Thus, the pulverulent sulfide may be intimately mixed with the pulverulent fertilizer or fertilizers and the resulting mixtures may, if desired, be compressed into granules or pellets, or the pulverulent sulfide may be mixed with the granular or pelleted fertilizer. Alternatively, a solution of the sulfide in a volatile solvent, for example, ethyl alcohol or acetone may be sprayed on the fertilizer or fertilizers, and the solvent then removed, or a solution of the sulfide in a solvent which is nonvolatile or of low volatility may be sprayed on the fertilizer or fertilizers. Suitable solvents for this purpose are the aromatic extracts of petroleum such as are available under the registered trademark "Kerex," primary and alpha-methyl-substituted aliphatic alcohols having 7 to 9 carbon atoms in the molecule, and mixtures thereof, obtainable from alkenes by the oxo process, and mixtures of such aromatic extracts and alcohols. This method of incorporation is particularly suitable with granular or pelleted fertilizers.

Liquid compositions of the invention may comprise a solution or dispersion of the sulfide, with or without chloral or chloral hydrate, in a liquid organic solvent or solvent mixture. The solvent or one of the solvents may be a hydrocarbon solvent, preferably an aromatic hydrocarbon or an aromatic extract of a petroleum distillate such as is available under the registered trademarks "Benzex" and "Kerex," or a chlorinated hydrocarbon solvent. Alternatively, the solvent or one of the solvents may be a hydrophilic solvent, preferably an alcohol or ketone. Examples of alcohols which may be used are ethanol, isopropanol, 2-butanol, diacetone alcohol, primary and alpha-methyl-substituted aliphatic alcohols having 7 to 9 carbon atoms in the molecule and mixtures thereof obtainable from alkenes by the oxo process, such as n-heptanol, n-octanol, n-nonanol, 2-methylhexanol-1, 2-methylheptanol-1, 2-methyloctanol-1 and mixtures thereof, and 3,5,5-trimethylhexanol-1 and glycols such as ethylene glycol, propylene glycol and 1,2-alkanediols containing 7 to 10 carbon atoms in the molecule. Examples of ketones which may be used are acetone, methyl ethyl ketone, methyl isobutyl ketone and cyclohexanone.

The concentration of sulfide in the hydrocarbon or chlorinated hydrocarbon solvent can be increased by incorporating a minor proportion, preferably 10 to 25% by volume of said hydrophilic solvent. Thus, by using as solvent a mixture of the aromatic extract available under the registered trademark "Kerex" and 10% by volume of 3,5,5-trimethylhexanol-1, cyclohexanone or diacetone alcohol, solutions containing 20% by weight of the sulfide can be obtained.

By incorporating an emulsifying agent in the above solutions or dispersions, emulsifiable or dispersible compositions are obtained which are further examples of the compositions of the invention.

The nature and amount of the dispersing and emulsifying agents used in the compositions of the invention will depend on the kind of composition and the ability of the agent to facilitate dispersion in the aqueous carrier. Thus, the emulsifying agent used may be one promoting the formation of either water-in-oil type emulsions or oil-in-water type emulsions on dilution with water, the former being particularly suitable for application by low volume spraying. To enable hard water to be used for dilution, the dispersing and emulsifying agents used are preferably of the non-ionic type, for example, the condensation products of alkylene oxides with alkyl phenols, abietic acid, naphthenic acids or oleyl alcohol and polyoxyethylene derivatives of sorbitan esters.

Ionic dispersing and emulsifying agents may, however, be used either alone or in conjunction with a non-ionic agent as aforesaid. Examples of ionic agents which may be used are alkyl aryl sulfonates and sodium salts of secondary alkyl sulfuric acid esters available under the registered trademark "Teepol" and oil-soluble naphthasulfonates, particularly the sodium salts obtainable as by-products in the manufacture of technical white oils and medicinal oils.

The preferred compositions of the invention are concentrates comprising a solution of the sulfide in a water-soluble organic solvent, for example, isopropyl alcohol, acetone or methyl ethyl ketone, and a non-ionic emulsifier, for example, Triton X-155, or oil-soluble naphthasulfonates. A composition of this type comprises, for example, 40% by weight of sulfide, 30% by weight of isopropyl alcohol, acetone or methyl ethyl ketone and 30% of sodium naphthasulfonates. These compositions are readily diluted with water for application.

The aqueous diluted compositions obtained on diluting the wettable powders or emulsifiable concentrates of the invention with water are included in the scope of the invention.

Applied in solution in an organic solvent to growing plants, bis(2,2,2-trichloro-1-hydroxyethyl)sulfide exhibits acute contact toxicity. When applied to seeds or to the growing medium, such as soil, containing seeds, this compound is markedly more toxic to monocotyledonous seeds than to dicotyledonous seeds. Thus, with reference to Table I, it can be seen that a dosage of only 2.4 pounds per acre was required to cause 90% inhibition of growth of oat seeds while the corresponding dosage for mustard seeds was 9.1 pounds per acre.

Bis(2,2,2-trichloro-1-hydroxyethyl)sulfide has a relatively high vapor pressure which promotes high initial toxicity. Thus, only a relatively short period need elapse before crops can safely be sown on the treated soil. Toxicity length of time at varying time periods after treatment of the soil is illustrated in Table II where bis(2,2,2-trichloro-1-hydroxyethyl)sulfide applied to the soil at the rate of, for example, 15 pounds per acre, one day prior to sowing seeds of "wild oats" (*Avena fatua*), resulted in 80% of the seeds being killed.

The bis(2,2,2-trichloro-1-hydroxyethyl)sulfide may be used in admixture with another herbicidally active compound, particularly a compound having pre-emergence activity. Such mixtures are a further feature of the invention. The sulfide may constitute 5 to 95% and preferably 40 to 60% by weight of such mixtures. Advantageously, the additional herbicidal compound is incorporated in the compositions of the invention hereinbefore described.

Especially useful are mixtures of the sulfide with a pre-emergence herbicide which is non-volatile or of low volatility. These herbicides have, in general, a long residual activity but a somewhat low initial toxicity. Examples of such herbicides are the alkali metal, especially sodium salts, ammonium salts and amine salts, for example, alkanolamine salts such as diethanolamine and triethanolamine salts and trialkylamine salts such as trimethylamine or tri-n-butylamine salts of trichloroacetic acid, 2,2-dichloropropionic acid and 2,2,3-trichloropropionic acid. Esters of these acids which are non-volatile or of low volatility may also be used, for example, the esters and partial esters of polyhydric alcohols such as ethylene glycol, 1,2-propanediol, glycerol or pentaerythritol and esters of haloaryloxy derivatives of alkanols of 1 to 5 carbon atoms such as 1-(2,5,5-trichlorophenoxy)-2-propanol or 1-(2,4-dichlorophenoxy)-2-propanol. Mixtures of such herbicides with bis(2,2,2-trichloro-1-hydroxyethyl)sulfide have both high initial toxicity and long residual activity.

If desired, other pesticidal compounds, for example, insecticides and fungicides, may be incorporated in the compositions of the invention.

The following examples illustrate the compositions of the invention and their effectiveness as plant growth regulants.

EXAMPLE I

A 5% by weight solution of bis(2,2,2-trichloro-1-hydroxyethyl)sulfide in a mixture of 4 parts by volume of kerosene and 1 part by volume of cyclohexanone was sprayed to run off on plants of couch grass, grass, rye, rape and flax growing in pots in a glasshouse. After 7 days, the flax was quite dead, the grass, couch grass and rye almost dead, and the rape was severely damaged.

EXAMPLE II

The post-emergence and pre-emergence herbicidal activities of the compositions of the invention were respectively assessed by determining the dosage, in pounds per acre, required to produce a 90% reduction in fresh weight of the treated plants relative to the fresh weight of untreated control plants, or a 90% reduction in fresh weight of seedlings produced from treated seeds relative to the fresh weight of seedlings from untreated seeds.

For the pre-emergence test, five-inch diameter pots were used each containing 50 seeds of oats or mustard sown on moist potting compost and covered with a layer of sand one-quarter of an inch deep.

For the post-emergence test, three-inch diameter flower pots were used containing, respectively, 25 oat plants or 25 linseed plants or 5 mustard plants. This test was carried out in duplicate.

A solution containing 1.2% by weight of bis(2,2,2-trichloro-1-hydroxyethyl)sulfide and 0.5% by weight of Triton X-155 in 40% by volume aqueous acetone solution was loaded into a variable dosage spraying machine of the type described in R. Pfeiffer et al., in Nature, volume 176, page 473 (1955), which is capable of applying logarithmically varying dosages automatically, a 40% by volume aqueous acetone solution containing 0.5% by weight of Triton X-155 being used for diluting the initial solution. The solutions were applied to the pots of test plants or seeds at the rate of 50 gallons per acre, and 5 dosages varying from 10 pounds per acre for the undiluted solution to 2 pounds per acre for the weakest solution were applied to successive pots of each plant species. Ten days later, the reduction in fresh weight of stem and leaf of the test plants and emerged seedlings relative to untreated plants and seedlings was then determined for each dosage. A linear quantal relationship existing between reduction in fresh weight and dosage enables a regression curve to be plotted from which the growth inhibitory dose, in pounds per acre, required to produce 90% inhibition of stem and leaf growth of the test plants (G.I.D. 90) was estimated. For comparative purposes, similar tests were also carried out with analogous solutions of the commercial herbicide sodium trichloroacetate. The results are summarized in Table I.

*Table I*

|  | Dosage for 90% inhibition of growth—G.I.D. 90, lb./acre | | | | |
| --- | --- | --- | --- | --- | --- |
|  | Pre-emergence | | Post-emergence | | |
|  | Oats | Mustard | Oats | Mustard | Linseed |
| Bis(2,2,2-trichloro-1-hydroxyethyl) sulfide | 2.4 | 8.1 | X | X | X |
| Sodium trichloracetate | 7.5 | X | X | X | X |

X indicates a G.I.D. 90 of more than 10 lb./acre.

It can readily be appreciated that bis(2,2,2-trichloro-1-hydroxyethyl)sulfide not only shows high selective toxicity to oats but is considerably more active than sodium trichloracetate when applied pre-emergence in the compositions described above.

EXAMPLE III

In the pre-emergence tests described in Example II, the toxic solutions were sprayed onto the surface of the growing medium. Since the test seeds were only 0.25 inch below the surface, adequate dispersion of the toxicant around the seeds to a depth of about 0.5 inch was insured.

In field practice, however, weed seeds and rhizomes lying two inches or more below the surface of the soil may germinate and it is therefore necessary to incorporate the toxicant thoroughly into the soil to a depth of at least 2 inches. This reduces the concentration of the toxicant and greater dosages of toxicant are therefore required for effective inhibition of weed growth. It may be expected that these dosages will be directly proportional to the depth of dispersion in the soil.

In this example are described tests carried out to determine the herbicidal dosage of bis(2,2,2-trichloro-1-hydroxyethyl)sulfide required when it is dispersed in soil to a depth of two inches.

A 10% by weight mixture of the sulfide with coarse sand was applied to two plots approximately one-hundredth of an acre in size and evenly and thoroughly incorporated into the top two inches of soil. Seeds of *Avena fatua* were sown in one plot one day after treatment and in the other plot 23 days after treatment. The same number of seeds *Avena fatua* was similarly sown in control plots which had been cultivated in an exactly similar way but had not been treated with the toxicant. For comparative purposes, similar plots were treated with sodium trichloroacetate dihydrate as a 10% by weight mixture with coarse sand, and also sown with *Avena fatua* seeds one day and 23 days after treatment. Fourteen days after sowing, the number of emerged seedlings in each plot was determined and the percentage kill estimated.

The percentage kill is given by the ratio $$\frac{\text{No. of seedlings in treated plot}}{\text{No. of seedlings in control plot}} \times 100$$

The emerged seedlings were cut off close to the ground in each plot, weighed immediately, and the percentage reduction in fresh weight of seedlings from treated plots compared with the fresh weight of seedlings from control plots was estimated.

The results of these trials are summarized in Table II.

*Table II*

THE RELATIVE TOXICITY OF BIS (2,2,2-TRICHLORO-1-HYDROXYETHYL)SULFIDE AND SODIUM TRICHLOROACETATE APPLIED AS SOLIDS TO SOIL PRIOR TO SOWING *AVENA FATUA* (FIELD EXPERIMENT)

| | Treatment | Dosage, lb./acre | Percentage kill | | Reduction in fresh weight, Percent |
| --- | --- | --- | --- | --- | --- |
| | | | Number of days between application of compound and sowing of seed | | |
| | | | 1 | 23 | 23 |
| (1) | Bis(2,2,2-trichloro-1-hydroxyethyl) sulfide. | 2.5 | 0 | 15 | 9 |
| (2) | do | 5.0 | 0 | 25 | 31 |
| (3) | do | 7.5 | 62 | 30 | 32 |
| (4) | do | 15.0 | 80 | 32 | 51 |
| (5) | do | 30.0 | 97 | 55 | 81 |
| (6) | Sodium trichloroacetate dihydrate. | 2.5 | 0 | 22 | 3 |
| (7) | do | 5.0 | 0 | 32 | 31 |
| (8) | do | 7.5 | 0 | 36 | 47 |
| (9) | do | 15.0 | 21 | 51 | 71 |
| (10) | do | 30.0 | 58 | 57 | 81 |

The high initial activity of bis(2,2,2-trichloro-1-hydroxyethyl)sulfide and the greater activity of the sodium trichloroacetate after 23 days for dosages up to 15 pounds per acre are noteworthy. At 30 pounds per acre, the sulfide causes nearly total kill of the seeds sown one day after treatment compared with only 58% kill for sodium trichloroacetate. After 23 days, the sodium trichloroacetate is only slightly more effective.

EXAMPLE IV

A series of tests was carried out to determine the relative toxicity of bis(2,2,2-trichloro-1-hydroxyethyl)sulfide, trichloroacetic acid and sodium trichloroacetate supplied as 10% by weight solutions of toxicant in 40% by volume aqueous acetone containing 2.5% by weight of Triton X–155. The solutions were placed in a variable dosage spraying machine as indicated in Example II and diluted with 40% by volume aqueous acetone solution containing 2.5% by weight of Triton X–155. Seed boxes containing 2 inches of moist potting compost were sprayed with the solutions. The soil in each box was then removed from the box, thoroughly mixed and then returned to the box, after which 100 seeds of *Avena fatua* were sown randomly in the box. Fourteen days later, the reduction in fresh weight of seedlings from treated boxes relative to the fresh weight of seedlings from similar untreated boxes was determined. The results are summarized in Table III.

*Table III*

THE RELATIVE TOXICITY OF BIS(2,2,2-TRICHLORO-1-HYDROXYETHYL) SULFIDE, TRICHLOROACETIC ACID, AND SODIUM TRICHLOROACETATE APPLIED IN LIQUID FORMULATION PRIOR TO SOWING *AVENA FATUA* (GLASSHOUSE EXPERIMENT)

| Compound | Percent reduction in fresh weight per seedling—Dosage, lb./acre | | | | |
| --- | --- | --- | --- | --- | --- |
| | 3.4 | 5.2 | 7.4 | 10.8 | 16.0 |
| Bis(2,2,2-trichloro-1-hydroxyethyl) sulfide | 54 | 59 | 74 | 72 | 88 |
| Trichloroacetic acid pure | 45 | 52 | 66 | 74 | 80 |
| Sodium trichloroacetate dihydrate | 7 | 17 | 53 | 70 | 75 |

We claim as our invention:
1. The method of inhibiting the growth of grass-type plants which comprises treating said plants with bis(beta,- beta,beta-trichloro-alpha-hydroxyethyl) sulfide and a carrier which is substantially inert with respect to said sulfide, the amount of said sulfide being sufficient to inhibit the growth of grass-type plants.

2. The method of inhibiting the growth of grass-type plants which comprises treating said plants with a herbicidal composition comprising bis(beta,beta,beta-trichloro-alpha-hydroxyethyl) sulfide, and an inert horticultural carrier therefor, said carrier being at least one member of the class consisting of aromatic hydrocarbons, alcohols of up to 10 carbon atoms and ketones of up to 6 carbon atoms, the sulfide being present in an amount sufficient to inhibit growth of grass-type plants.

3. The method of inhibiting the growth of grass-type plants which comprises treating said plants with a herbicidal composition comprising bis(beta,beta,beta-trichloro-alpha-hydroxyethyl) sulfide, and an inert finely divided solid horticultural carrier therefor, the sulfide being present in an amount sufficient to inhibit growth of grass-type plants.

References Cited by the Examiner
UNITED STATES PATENTS
2,668,103    2/54    Goodhue _____ 71—2.7 X

OTHER REFERENCES

Fichet in "Chemical Abstracts," vol. 40, col. 379(3).
Guerin in "Chemical Abstracts," vol. 17, col. 2902(8), 1923.
Guerin et al. in "Chemical Abstracts," vol. 14, col. 3445(8).
Lewis in "J. Chem. Soc.," 1940, pages 831 to 832.

LEWIS GOTTS, *Primary Examiner.*

M. A. BRINDISI, *Examiner.*